Figure 1:
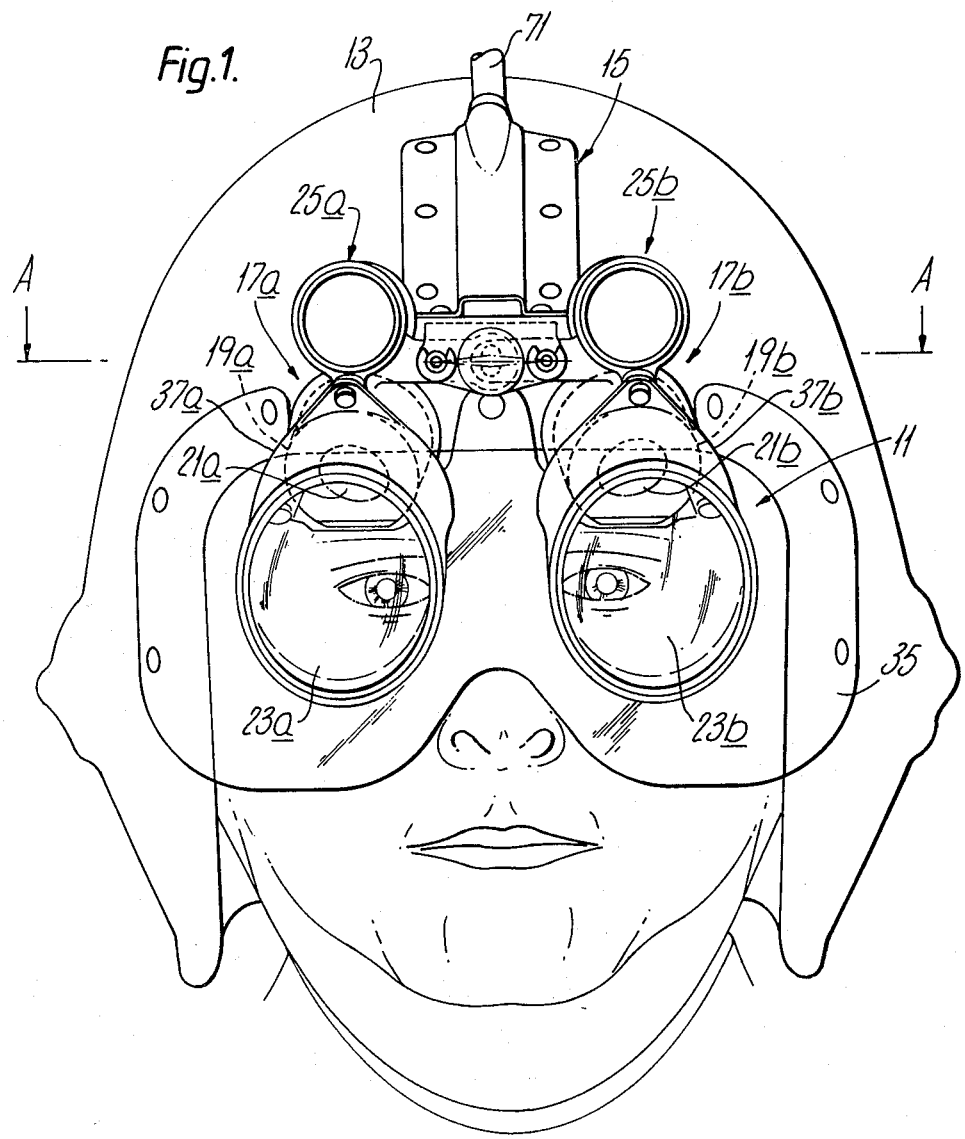

United States Patent [19]
Ellis

[11] Patent Number: 4,468,101
[45] Date of Patent: Aug. 28, 1984

[54] NIGHT VISION GOGGLES

[75] Inventor: Stafford M. Ellis, West Sussex, England

[73] Assignee: Marconi Avionics Limited, England

[21] Appl. No.: 381,403

[22] Filed: May 24, 1982

[30] Foreign Application Priority Data

May 29, 1981 [GB] United Kingdom ............... 8116451

[51] Int. Cl.³ ...................... G02B 23/06; G02B 23/12; G02B 23/18
[52] U.S. Cl. .................................... 350/538; 350/547; 350/552; 350/174
[58] Field of Search ............... 350/538, 174, 547, 548, 350/549, 551, 552, 569, 298; 250/213 VT, 213 R

[56] References Cited

U.S. PATENT DOCUMENTS

| | | | |
|---|---|---|---|
| 3,670,097 | 6/1972 | Jones | 350/538 |
| 3,816,005 | 6/1974 | Kirschner | 350/174 |
| 4,081,209 | 3/1978 | Heller et al. | 350/174 |
| 4,116,528 | 9/1978 | Clarke | 350/540 |
| 4,124,798 | 11/1978 | Thompson | 350/538 |
| 4,361,384 | 11/1982 | Bosserman | 350/174 |

FOREIGN PATENT DOCUMENTS 2006463 5/1979 United Kingdom.

Primary Examiner—Jon W. Henry
Attorney, Agent, or Firm—Kirschstein, Kirschstein, Ottinger & Israel

[57] ABSTRACT

An optical device suitable for attachment to headgear (13) such as a pilot's helmet, for use as a night vision goggle (11) wherein an image intensifier (19a or 19b) whereby radiation in the visible and/or near infra-red portions of the spectrum received from the scene to be viewed is converted to visible light is arranged so that its input (33a or 33b) and output (21a or 21b) faces are directed respectively away from and towards the scene to be viewed, light from the output face being reflected to the user's eyes by a viewing eyepiece (23a or 23b) which intercepts the user's line of sight, and the received radiation being directed onto the input face by an objective and ray-folding means (27a or 27b; 29a or 29b; 31a or 31b). A design of goggle which is lighter and has a smaller forward projection can be achieved in goggles using such optical devices.

8 Claims, 7 Drawing Figures

NIGHT VISION GOGGLES

This invention relates to night vision goggles.

The invention relates especially to night vision goggles for use by pilots of high performance aircraft having a pilot ejection facility. The available goggles are unsuitable for such use being heavier and projecting further forward of the pilot's helmet than is acceptable. Under high g manoeuvres of an aircraft as aforesaid the mass and forward projection of available goggles, give rise to an excessive turning moment acting on the pilot's helmet and head.

The available binocular forms of night vision goggle have no practical utility in the cockpit environment of high performance aircraft, being of use primarily in land vehicles such as tanks. Available biocular night vision goggles besides being too heavy and projecting too far forward from the pilot's helmet have the further major disadvantage that failure of the image intensifier or, indeed, any element of the goggle that is common to both of the individual eyepiece reflectors results in total loss of use of the goggle. Moreover in the case of biocular goggles the presence in many aircraft of windshield vertical frame members presents obstructions in the forward field of view, demanding lateral head movement in order to acquire a full view of the forward scene.

It is an object of the present invention to provide a night vision goggle of a form suitable for use by the pilot of a high performance aircraft.

According to the present invention an optical device suitable for attachment to headgear, such as a pilot's helmet, for use as a night vision goggle comprises: an image intensifier having input and output faces which, with the device attached to the headgear, are respectively directed rearwards and forwards, that is to say in directions respectively away from and towards the scene forward of the eyes of a user wearing the headgear; forward of the output face of the image intensifier, a viewing eyepiece which in use intercepts the user's forward line of sight, and reflects light from the output face of the image intensifier to the viewing position of the user; and an optical system which incorporates an objective and ray-folding means and receives radiation to which the image intensifier is responsive from the forward scene and directs said radiation to the input face of the image intensifier.

The viewing eyepiece may be a collimating eyepiece; may comprise a tuned optical coating on a light transmissive substrate and may be arranged to exhibit optical corrective properties by virtue of having aspheric reflective characteristics. Where a tuned optical coating is used, this may be in the form of a dichroic coating, but it may alternatively be a holographically formed coating. The aspheric reflective characteristics, when provided, may arise by virtue of the geometric shape of the substrate on which the coating is deposited (and this will be so in the case of dichroic coatings); or they may arise from the method by which a holographic coating is produced.

In one particular embodiment of the invention for use as a binocular night vision goggle there are provided two optical devices as aforesaid, the said two devices being supported side by side with their viewing eyepieces spaced apart, i.e. by a distance appropriate to the user's interocular spacing.

In such an arrangement means may be provided for varying the spacing between the viewing eyepieces so as to accommodate the goggle to the user's interocular spacing.

The prior art goggles, whether binocular or biocular, have a configuration in which the image intensifier or intensifiers have their output faces directed towards the user. In the case of the biocular arrangements the image intensifier is between an objective and a beam splitter arrangement; in the case of known binocular goggles there is an image intensifier in the direct line of sight of each eye of the user using the goggles.

In the present invention the output or outputs of the image intensifier or image intensifiers, as the case may be, direct light in a direction away from the user for subsequent reflection to the user. By virtue of this difference in the configuration of the optical device according to the invention as compared with prior art arrangements a design of goggle may be achieved which is lighter and has less overhang (forward projection) than that achievable in the prior art arrangements.

Figure 2:
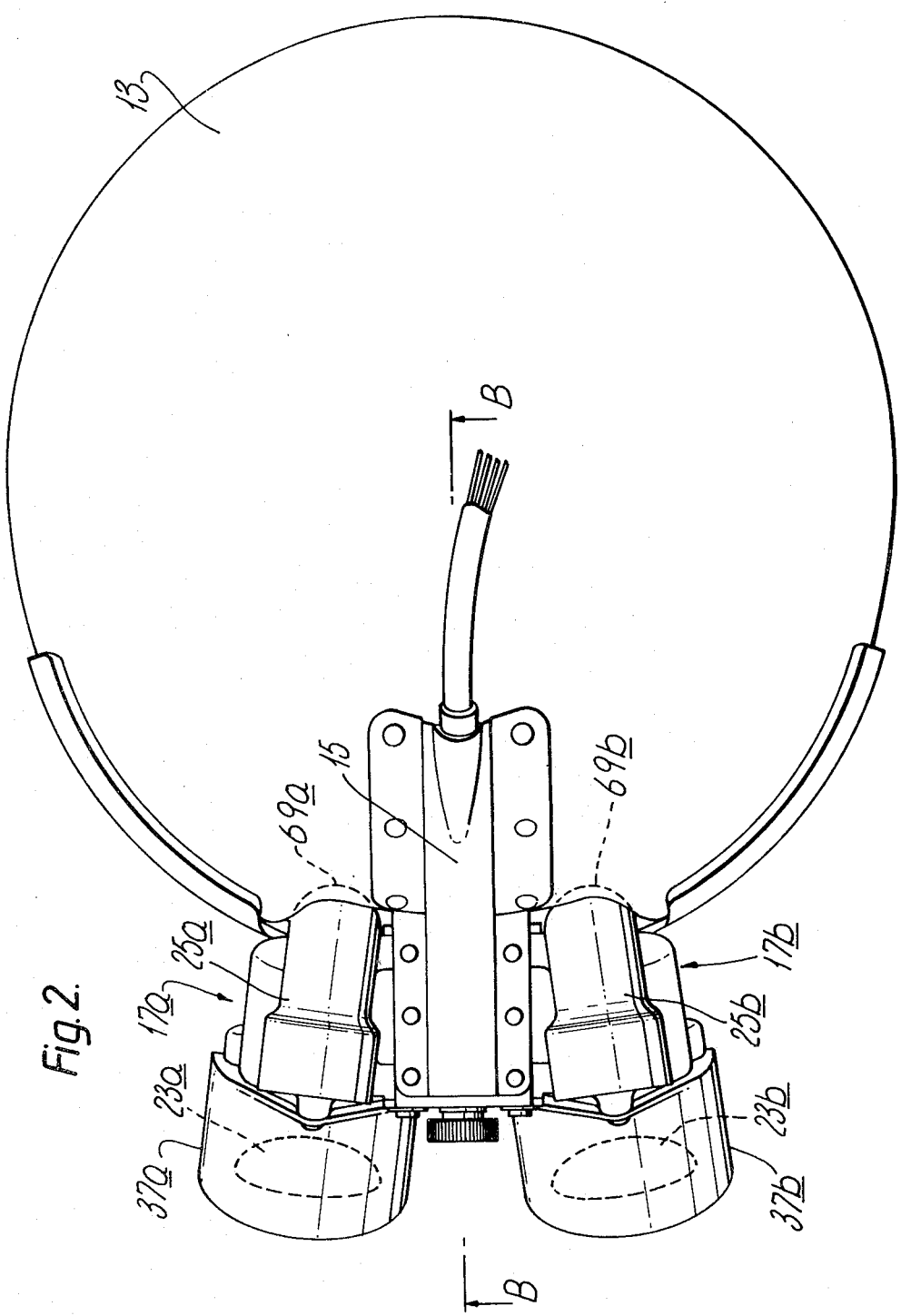
Figure 3:
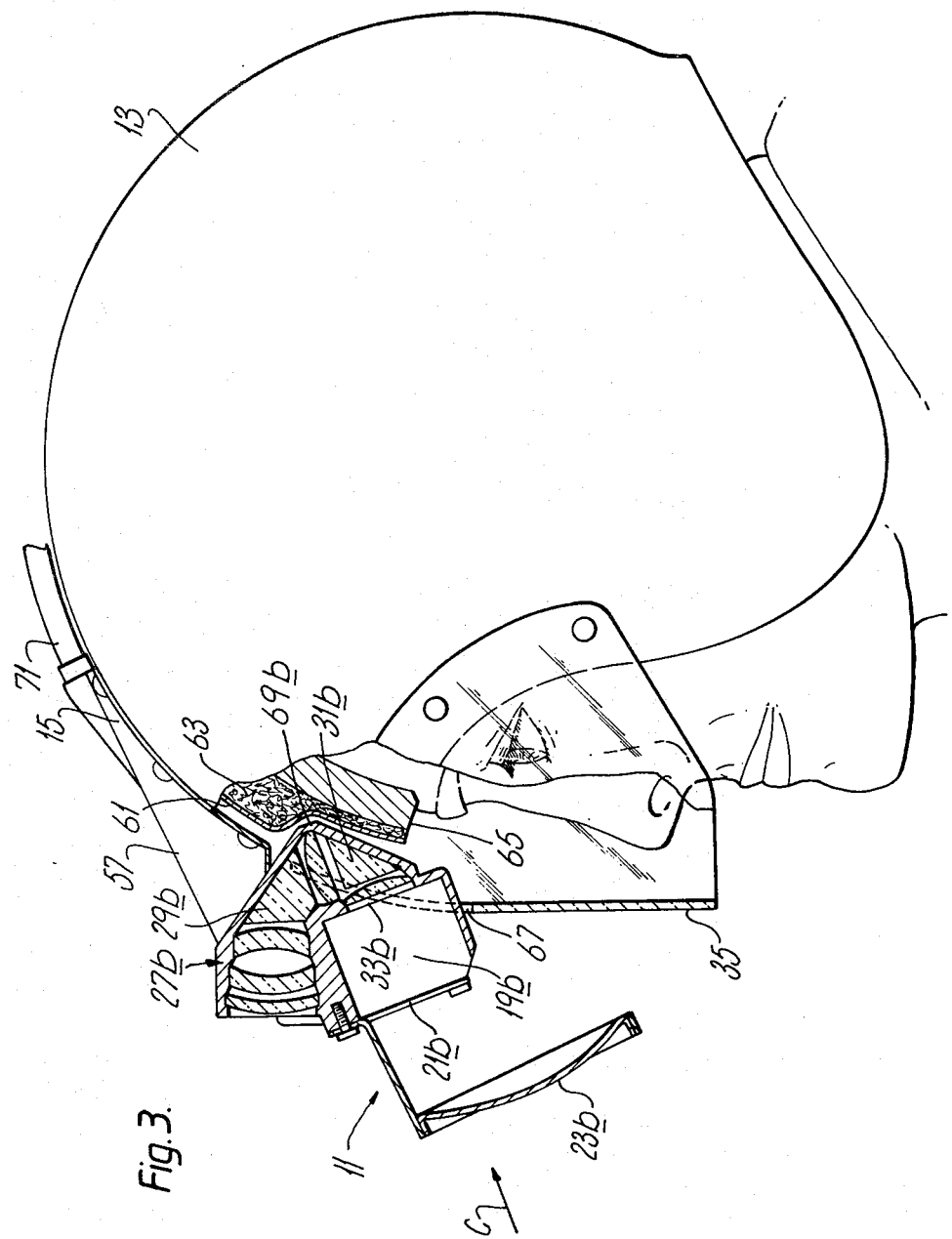
Figure 4:
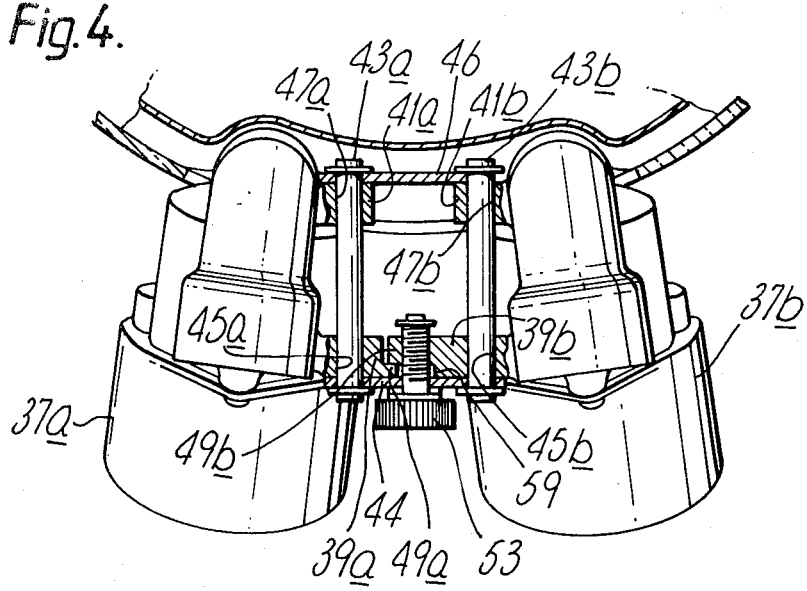
Figure 5:
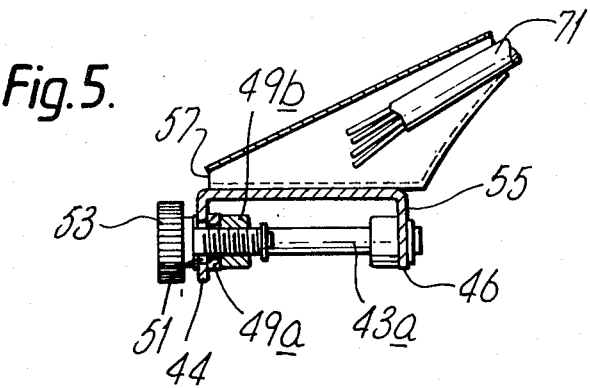
Figure 6:
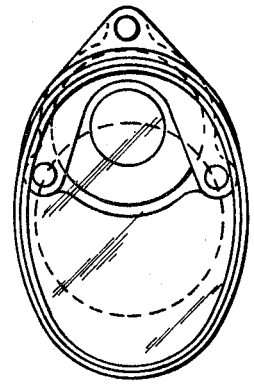
Figure 7:
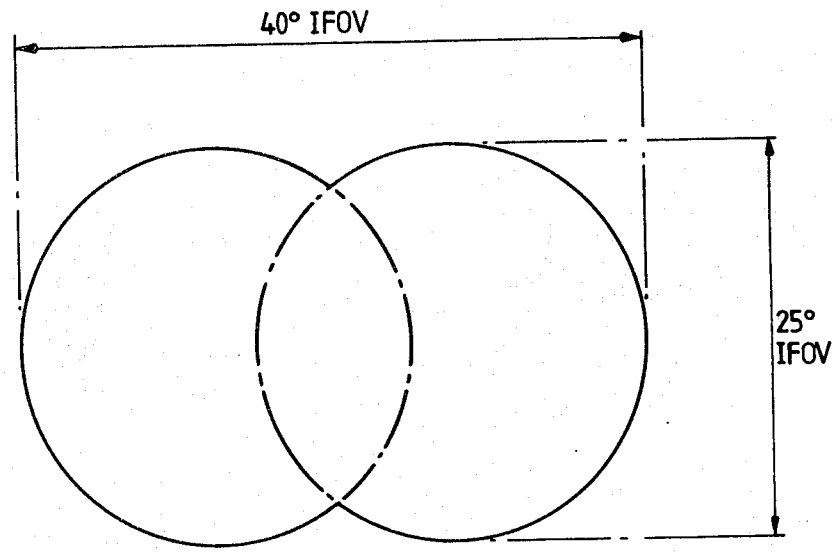

One night vision goggle in accordance with the invention attached to a helmet worn by a pilot will now be described by way of example with reference to the accompanying drawings in which:

FIG. 1 is a front elevation of the goggle;
FIG. 2 is a plan view of the goggle;
FIG. 3 is a part-sectional side elevation of the goggle;
FIG. 4 shows a part section on line A—A of FIG. 1;
FIG. 5 is a scrap view taken on line B—B of FIG. 2;
FIG. 6 is a view of part of the goggle in the direction of arrow C of FIG. 3; and
FIG. 7 is a representation of the instantaneous field of view available to the user of the goggle when mounted as shown in FIGS. 1, 2 and 3.

The goggle, which is of the binocular type, is intended for use by the pilot of a high performance aircraft.

Referring to FIGS. 1, 2 and 3 of the drawings, the goggle 11 is secured to the frontal marginal portion of the pilot's helmet 13 by a mounting 15.

The goggle comprises two optical devices 17a and 17b. Each of the devices 17a and 17b comprises an image intensifier 19a or 19b disposed with its input and output faces directed respectively away from and towards the scene forward of the eyes of the wearer of the helmet. Each of the optical devices 17a and 17b further includes a collimating viewing eyepiece 23a or 23b, which eyepieces respectively lie in the forward lines of sight of the two eyes of the helmet wearer. Light from the output faces 21a, 21b of the intensifiers 19a, 19b is respectively directed onto the eyepieces 23a and 23b which serve to reflect such light to the helmet wearer's eyes. The eyepieces 23a, 23b are transmissive to light from the forward scene thus allowing the helmet wearer to view the forward scene directly through the eyepieces.

To provide the helmet wearer with a night vision capability, electromagnetic radiation in the visible and/or near infra-red portions of the spectrum is directed on to the input faces 33a and 33b of the intensifiers 19a, 19b via similar optical systems 25a, 25b in the two devices 17a, 17b. The complete optical system 25b for the helmet wearer's left eye is shown in section in FIG. 3, but only parts of the other optical system are shown in the drawings. Each optical system has an objective lens arrangement 27a or 27b and ray-folding means in the forms of two prisms (29b and 31b for the left eye optical system), the elements of the objective lens arrangement and ray-folding means being interspersed as shown in FIG. 3.

The radiation directed onto the input faces 33a, 33b of the intensifiers 19a, 19b relates to the central region of the forward scene that is viewable directly through the eyepieces 23a and 23b by the helmet wearer. The corresponding pattern of visible light is produced at the output faces 21a, 21b of the intensifiers 19a, 19b comprising an image of this central portion of the forward scene, the eyepieces 23a, 23b presenting a collimated image of this part of the forward scene to the helmet wearer.

By virtue of the configuration of the several elements of the optical devices, 17a, 17b (a configuration made possible by the "forward looking" orientation of the image intensifiers 19a, 19b) there is provided a night vision goggle which is, at once, relatively lightweight, and of relatively short overhang, whilst providing good eye relief or clearance to the wearer. The eye clearance offers the wearer a ready opportunity to observe the forward scene to either side of the eyepieces 23a, 23b and to eliminate to a substantial degree the claustrophobic character of prior art arrangements both biocular and binocular. The clearance is sufficiently great to enable these advantages to be realised even to a user wearing vision corrective spectacles.

Each of the optical devices 17a, 17b, has a housing 37a or 37b. As shown in FIG. 4, there are lugs 39a, 41a and 39b, 41b projecting respectively from the housings 37a and 37b. A pivot pin 43a extends through aligned passages 45a, 47a through the fore and aft lugs 39a, 41a of the housing 37a; a second pivot pin 43b extends through passages 45b, 47b through fore and aft lugs 39b, 41b of the housing 37b.

The pivot pins 43a, 43b, are supported at each end by the mounting 15. As shown in FIG. 5, the mounting 15 comprises a channel part 55 through pairs of aligned holes in whose flanges 44, 46 the pins 43a, 43b extend, and a shaped sheet metal member 57 to which the channel part 55 is secured, as by rivets, and which is, itself, secured to the outer skin of the helmet 13. The flange 44 of the channel part 55 has a slot 51 extending perpendicular to its longer dimension.

The forward lugs 39a, 39b have complementary stepped portions 49a, 49b. The stepped portion 49a of the lug 39a has a slot 59 extending in the longitudinal direction of the lug. The slot 59 and the slot of the flange 44 are of equal width, providing a sliding clearance for the shank of a clamping screw 53. The clamping screw 53 is screwingly engaged in the lug 39b and, being trapped by the flange 44 and the lug 39a at the intersection of their slots, serves not only as a clamp but also as a guide and stop for complementary pivotal movement of the lugs 39a, 39b and hence of the optical devices of which the lugs form part, about the pivot pins 43a and 43b respectively. It will be appreciated that such limited pivotal movement enables the user to set the positions of the eyepieces 23a, 23b to his interocular spacing. The shaped member 57 may be in two hinged parts permitting the entire goggle to be rocked by the user between the operative position illustrated and an erect stowed position clear of the pilots vision.

The helmet has an outer skin 61 and outer protective cladding 63 which are stepped around a frontal marginal edge 65 of the helmet. The helmet is provided with a visor 35 formed with an elongate opening 67 corresponding in position and length to the position and length of the stepped frontal helmet portion.

The housings 37a, 37b project rearwardly forming dog houses 69a, 69b which accommodate the optical systems of the optical devices 17a, 17b and which project through the opening 67 of the visor 35 into the stepped portion of the helmet. Power for the image intensifiers is supplied by way of a cable 71.

The collimating eyepieces 23a, 23b each comprise a transparent plastic substrate, aspheric in form, and carrying on its inner surface a dichroic coating. The asphericity of the coating corrects, to a large degree, optical aberrations such, for example, as coma. Astigmatism in the optical system may if desired be corrected, following the usual practice, by using a cylindrical element in the optical system.

Alternatively the coatings on the inner surfaces of eyepieces 23a, 23b may be optical coatings of, say, dichromated gelatine suitably irradiated using laser light to produce holographically in the gelatine characteristics such that the coating is highly reflective to light from the image intensifiers without significant impairment to the transmission of light from the forward scene. Where it is required to view a holographic head-up display using the goggle the use of holographically produced coatings for the eyepieces 23a, 23b may prove unsatisfactory. Dichroic coatings will however be acceptable although the transmissive/reflective properties may then be less satisfactory.

The aspheric coatings may be paraboloidal; but ellipsoidal coatings, which are more easily produced, are normally satisfactory. The aperture of the eyepieces 23a, 23b may be elliptical as shown in FIG. 6.

FIG. 7 illustrates the instantaneous field of view (IFOV) of a typical night goggle as described above by way of example.

It will be appreciated that whilst the abovedescribed embodiment comprises two optical devices in accordance with the invention forming a binocular night vision goggle, optical devices in accordance with the invention may also be utilised in biocular or monocular night vision goggles.

I claim:

1. In combination, headgear and an optical device for use as a night vision goggle, said optical device being attached to said headgear and comprising:
   (A) an image intensifier having input and output faces which are respectively directed rearwards and forwards, that is to say in directions respectively away from and towards the scene forward of the eyes of a user wearing the headgear;
   (B) forward of the output face of the image intensifier, a viewing eyepiece which in use intercepts the output face of the image intensifier to the viewing position of the user; and
   (C) an optical system which incorporates an objective and ray-folding means and receives the forward scene and directs said radiation to the input face of the image intensifier.

2. A combination according to claim 1 wherein said eyepiece is a collimating eyepiece.

3. A combination according to claim 2 wherein said eyepiece is light transmissive to allow the user to view the forward scene directly through said eyepiece.

4. A combination according to claim 3 wherein said eyepiece comprises a tuned optical coating on a light transmissive substrate.

5. A combination according to claim 1 wherein said eyepiece has aspheric reflective characteristics to provide correction for optical aberrations.

6. A combination according to claim 1 wherein said ray-folding means comprises two prisms.

7. In combination, headgear and a binocular night vision goggle attached thereto and comprising two optical devices according to claim 1 supported side by side with their viewing eyepieces spaced apart.

8. In combination, headgear and a goggle according to claim 7 attached thereto and including means for varying the spacing between the viewing eyepieces so as to accomodate the goggle to the user's interocular spacing.

* * * * *